(12) United States Patent
Rauchenschwandtner

(10) Patent No.: US 12,474,233 B2
(45) Date of Patent: Nov. 18, 2025

(54) METHOD FOR DETERMINING A BEARING FRICTION

(71) Applicant: Palfinger AG, Bergheim bei Salzburg (AT)

(72) Inventor: Hannes Rauchenschwandtner, Poendorf (AT)

(73) Assignee: PALFINGER AG, Bergheim bei Salzburg (AT)

( * ) Notice: Subject to any disclaimer, the term of this patent is extended or adjusted under 35 U.S.C. 154(b) by 287 days.

(21) Appl. No.: 18/236,714

(22) Filed: Aug. 22, 2023

(65) Prior Publication Data

US 2023/0393022 A1 Dec. 7, 2023

Related U.S. Application Data

(63) Continuation of application No. PCT/AT2022/060042, filed on Feb. 11, 2022.

(30) Foreign Application Priority Data

Feb. 23, 2021 (AT) .......................... GM 50029/2021

(51) Int. Cl.
*G01M 13/00* (2019.01)
*F16C 41/00* (2006.01)
*G01M 13/04* (2019.01)

(52) U.S. Cl.
CPC ............ *G01M 13/04* (2013.01); *F16C 41/00* (2013.01); *F16C 2233/00* (2013.01); *F16C 2326/00* (2013.01)

(58) Field of Classification Search
CPC ..... G01M 13/04; F16C 41/00; F16C 2233/00; F16C 2326/00; B66C 23/54; B66C 23/88;
(Continued)

(56) References Cited

U.S. PATENT DOCUMENTS

| 9,292,011 B2 | 3/2016 | Suzuki et al. |
| 9,645,565 B2 | 5/2017 | Nilsson |

(Continued)

FOREIGN PATENT DOCUMENTS

| CN | 201567165 | 9/2010 | |
| CN | 117484132 A * | 2/2024 | ............... B23P 19/02 |

(Continued)

OTHER PUBLICATIONS

International Search Report issued Jun. 1, 2022 in International (PCT) Application No. PCT/AT2022/060042.

*Primary Examiner* — Francis C Gray

(74) *Attorney, Agent, or Firm* — Wenderoth, Lind & Ponack, L.L.P.

(57) ABSTRACT

A method of determining a bearing friction is to be applied to an arm system of a crane arm having a first crane arm and a second crane arm. The second crane arm, at least in some regions, is mounted displaceably and/or articulatedly in or on the first crane arm via a bearing point. In a first capturing method step (i), at least one first value is captured. In a drive method step (ii), at least the second crane arm is moved relative to the first crane arm. In a second capturing method step (iii), at least one second value is captured. In an evaluation method step (iv), the bearing friction of the bearing point is characterized by evaluating the at least one first value and the at least one second value.

14 Claims, 16 Drawing Sheets

(58) Field of Classification Search
CPC ....... B66C 23/905; B66C 15/00; B66C 13/16; B66C 23/36; G06Q 10/20
See application file for complete search history.

(56) References Cited

U.S. PATENT DOCUMENTS

| | | | |
|---|---|---|---|
| 10,294,636 B2 | 5/2019 | Leslie et al. | |
| 10,533,306 B2 | 1/2020 | Sherlock | |
| 10,782,202 B2 | 9/2020 | Bonnet et al. | |
| 11,161,721 B2* | 11/2021 | Edeler | B66C 13/16 |
| 11,319,193 B2* | 5/2022 | Stilborn | B66D 1/485 |
| 11,441,967 B2 | 9/2022 | Bonnet et al. | |
| 11,493,397 B2 | 11/2022 | Bonnet et al. | |
| 11,554,939 B2 | 1/2023 | Bergmayr et al. | |
| 2007/0208841 A1* | 9/2007 | Barone | B61L 15/0027 709/223 |
| 2014/0052299 A1 | 2/2014 | Suzuki et al. | |
| 2015/0248121 A1 | 9/2015 | Nilsson | |
| 2018/0258617 A1 | 9/2018 | Leslie et al. | |
| 2019/0031474 A1 | 1/2019 | Stilborn et al. | |
| 2019/0033158 A1 | 1/2019 | Bonnet et al. | |
| 2019/0127958 A1* | 5/2019 | Sherlock | E02F 9/268 |
| 2019/0233258 A1 | 8/2019 | Reischauer et al. | |
| 2020/0025640 A1 | 1/2020 | Bonnet et al. | |
| 2020/0223671 A1 | 7/2020 | Bergmayr et al. | |
| 2021/0033482 A1 | 2/2021 | Bonnet et al. | |
| 2022/0194751 A1 | 6/2022 | Stilborn et al. | |
| 2022/0205224 A1* | 6/2022 | Koga | G06T 7/246 |
| 2022/0251808 A1 | 8/2022 | Miyoshi et al. | |

FOREIGN PATENT DOCUMENTS

| | | | |
|---|---|---|---|
| DE | 10 2018 216 718 | 5/2019 | |
| EP | 2 202 194 | 6/2010 | |
| EP | 2 947 035 | 11/2015 | |
| FI | 122429 B * | 1/2012 | ........... B66C 23/905 |
| JP | 2007-326680 | 12/2007 | |
| JP | 2019-530627 | 10/2019 | |
| KR | 10-2015-0086277 | 7/2015 | |
| KR | 10-2019-0065383 | 6/2019 | |
| KR | 10-2020-0059259 | 5/2020 | |
| KR | 102276714 B1 * | 7/2021 | ............. G01G 19/14 |
| WO | 2012/147751 | 11/2012 | |
| WO | 2016/101003 | 6/2016 | |
| WO | 2018/068071 | 4/2018 | |
| WO | 2021/010248 | 1/2021 | |

* cited by examiner

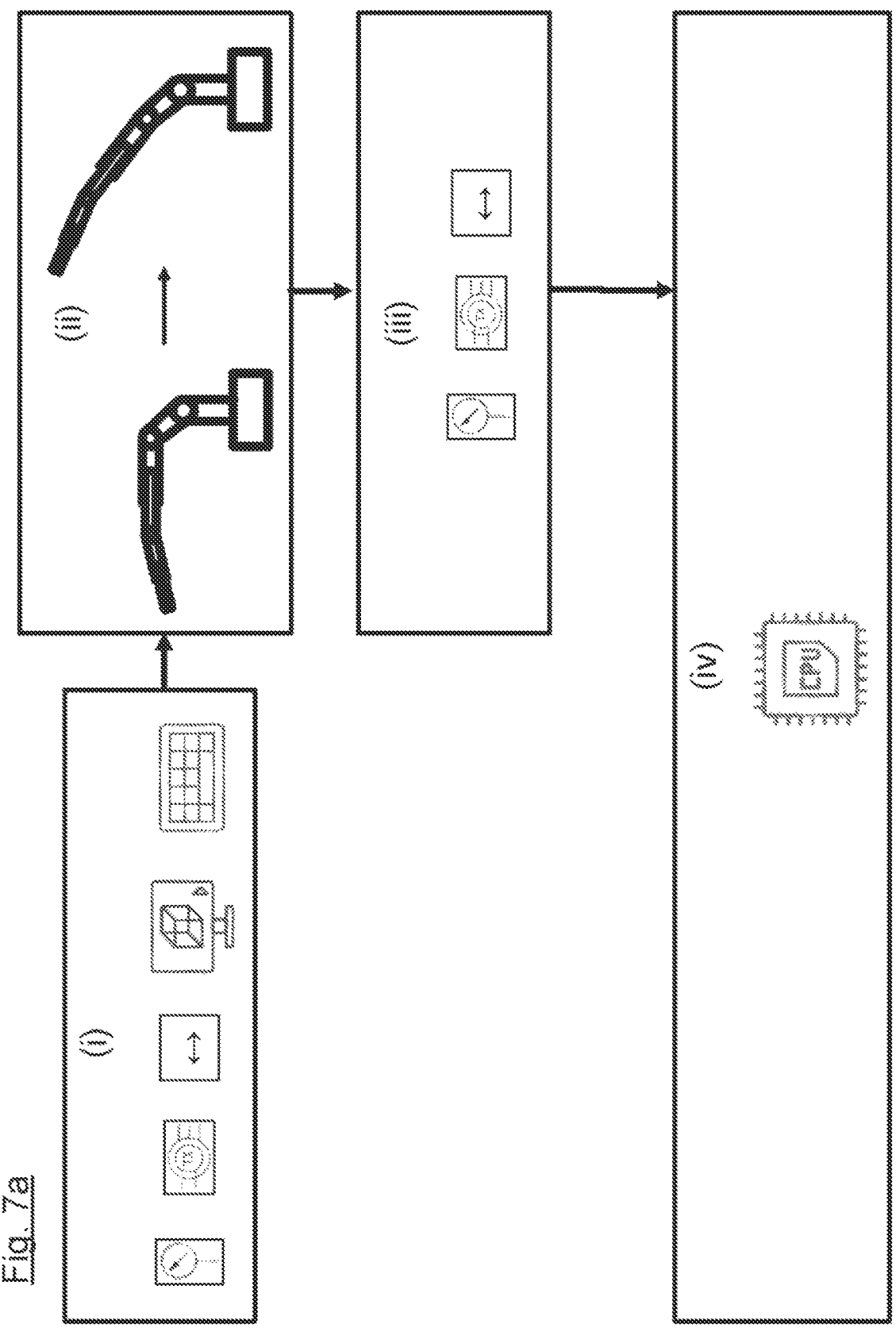

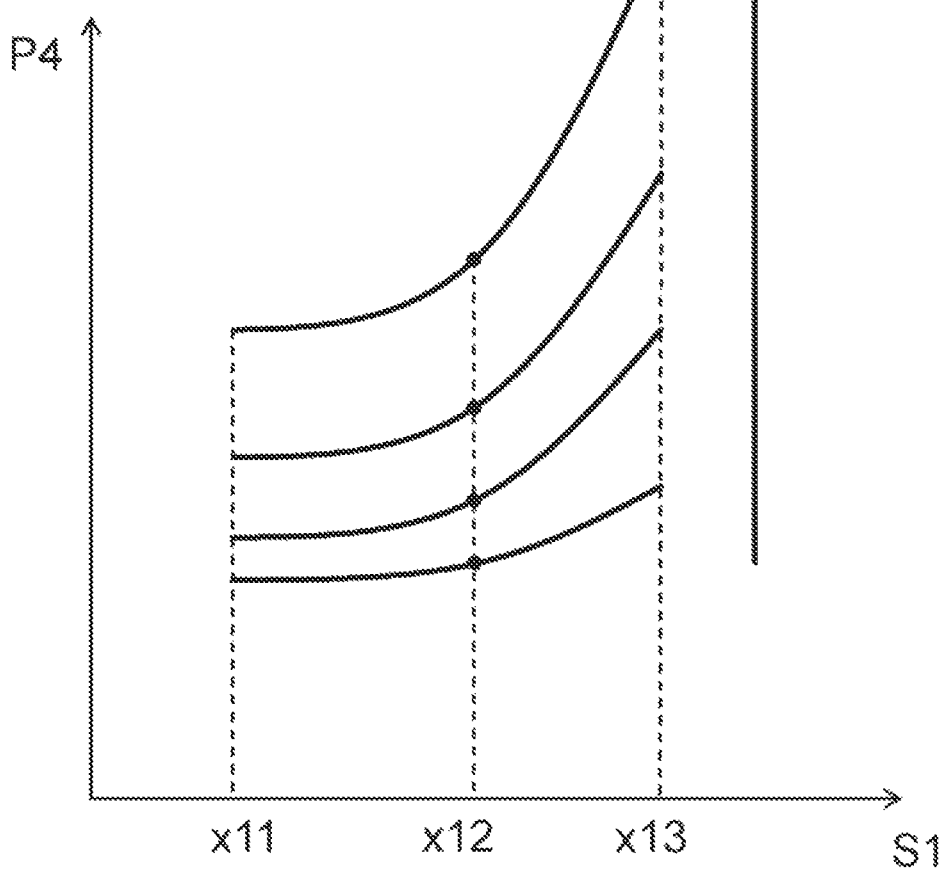
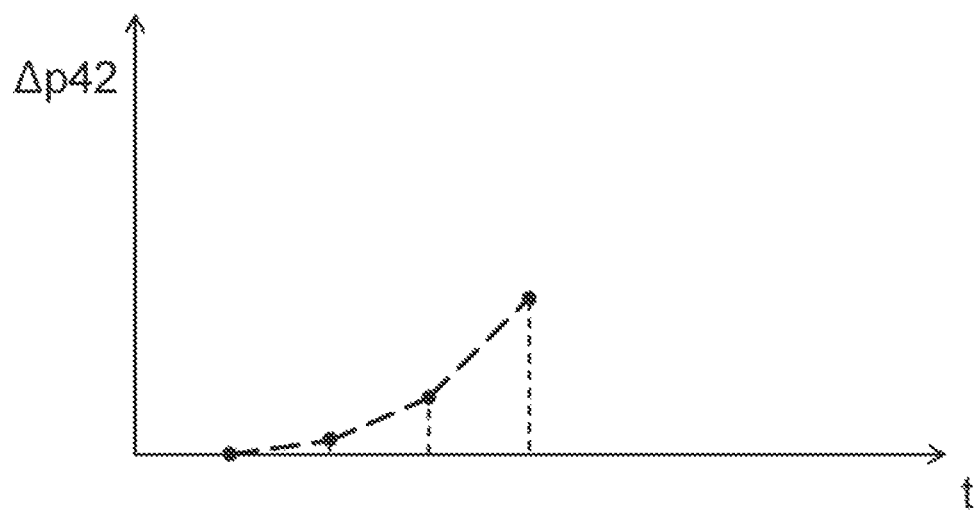

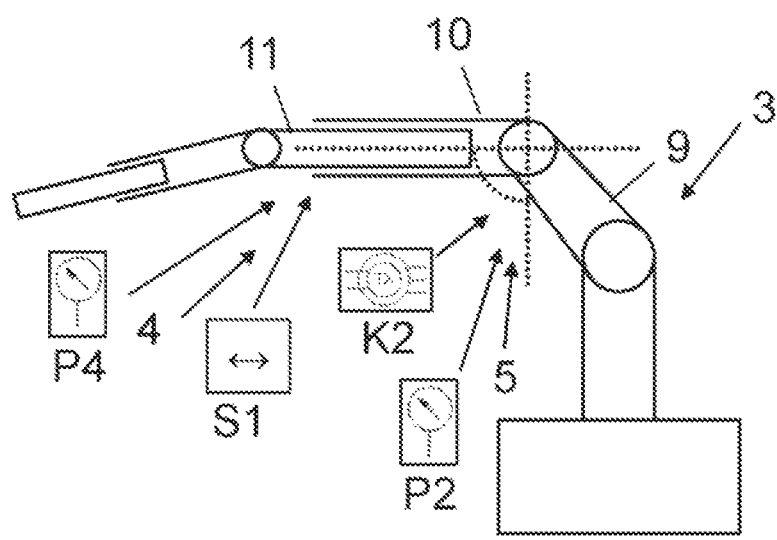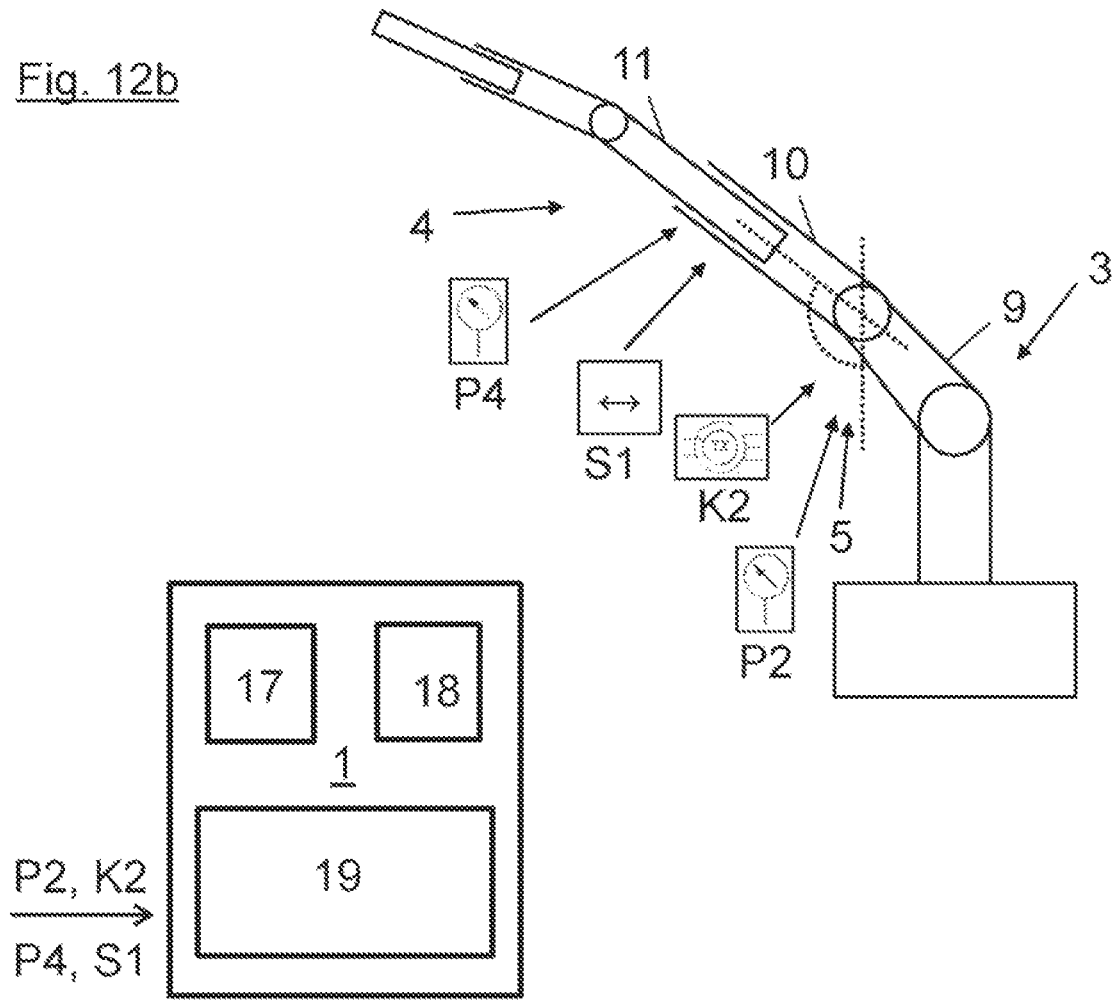

METHOD FOR DETERMINING A BEARING FRICTION

BACKGROUND OF THE INVENTION

The invention relates to a method for determining a bearing friction.

The invention further relates to a computer program product for performing such a method, to a controller for carrying out such a method, and to a crane having such a controller.

It is known in the state of the art that signs of wear arise at bearing points of crane arms. To ensure safety during operation, bearing points are preventively maintained or reconditioned, wherein this is often done unnecessarily early before the signs of wear actually arise. On the other hand, signs of wear are often detected too late, which can lead to damage to the crane arm, considerable deterioration of performance or an unplanned stoppage.

SUMMARY OF THE INVENTION

The object of the invention is to prevent the above-mentioned problems with bearing points of crane arms. In particular, the intention is for the length of maintenance periods to be able to be properly determined and for damage to be able to be predicted and, where applicable, located.

The method is used for determining a bearing friction in at least one bearing point of an arm system of a crane arm.

Determining the bearing friction can involve acquiring a bearing friction in a qualitative and/or quantitative manner.

A bearing friction can be based on a single bearing point or on a plurality of bearing points of an arm system.

The crane arm can have at least one first crane arm and one second crane arm, wherein the second crane arm is mounted displaceably at least in some portions in the first crane arm by means of at least one bearing point and/or the second crane arm is mounted in a hinged manner on the first crane arm by means of at least one bearing point.

It should not be ruled out that the crane arm has a plurality of crane arms interconnected in a hinged manner.

In one embodiment, as crane arms the crane arm can have at least a crane pillar, a lifting arm mounted in a hinged manner on said crane pillar and an articulated arm mounted in a hinged manner on said lifting arm. The articulated arm can be configured to be length-adjustable having extenders that are displaceable with respect to one another. A further crane arm, for instance in the form of a further articulated arm, can be arranged in a hinged manner on the articulated arm. It should not be ruled out that the lifting arm has extenders that are displaceable with respect to one another.

In general, the at least one first crane arm and the at least one second crane arm can be interconnected in a hinged manner by means of a bearing point.

The arm system has at least one drive for the at least first and second crane arm.

When the at least one drive of the arm system is activated, a relative movement between the at least one first and second crane arm can generally be brought about. In particular, such a movement can be driven actively. It is also conceivable that the activation permits a movement, in which case the drive can, for example, be effected by the action of gravity.

Activating the at least one drive can generally involve a user controlling the arm system of the crane arm by issuing control commands to the drive(s). Autonomous control of the arm system of the crane arm by, for instance, an arithmetic logic unit configured for that purpose is also conceivable.

In a first acquisition method step of the method, at least one first value can be acquired, which is characteristic of a bearing friction of the at least one bearing point during a first activation—in particular during the first activation—of the at least one drive of the arm system for moving at least the second crane arm relative to the first crane arm.

In general, for the purpose of the method, acquiring a value can involve:

reading out a value from a memory, preferably from a memory that communicates with an arithmetic logic unit configured for carrying out the method, and/or storing a value in such a memory, preferably via a user interface, and/or measuring a value.

The first value acquired in the first acquisition method step can generally be characteristic of a bearing friction that can or does arise when at least the second crane arm is moved relative to the first crane arm.

The first value acquired in the first acquisition method step can be a characteristic guide value or reference value for a bearing friction.

The first value acquired in the first acquisition method step can, for example, be an actual value—such as a measured value—or an assumed value—such as a value originating from a table, simulation or calculation.

The first acquisition method step can generally be the starting point for a measurement series consisting of a plurality of measurements.

In a driving method step of the method, a second activation of the at least one drive of the arm system can be effected, in which at least the second crane arm is moved relative to the first crane arm.

During the relative movement, brought about by the second activation, of at least the second crane arm relative to the first crane arm, a bearing friction arises at and/or in the at least one bearing point.

In a second acquisition method step of the method, during the second activation of the at least one drive at least one second value can be acquired, which is a measured value that is characteristic of a bearing friction of the at least one bearing point.

The first value and/or the second value can be measured by means of suitable sensors.

In general, the first and/or the second value can be individual values or sets of values, in particular sets ordered in accordance with a temporal or spatial order relation. In particular, the values or sets can be ordered by time, angle or displacement.

In the second acquisition method step, during the relative movement, brought about by the second activation, of at least the second crane arm relative to the first crane arm a second value that is characteristic of the arising bearing friction is acquired in the form of a measured value.

The method comprises further, similarly designed method steps having activations and acquisitions, which take place in and/or during the activations, of values, in particular measured values, that are characteristic of the bearing friction.

The further method steps can be further parts of a measurement series.

In an evaluation method step of the method, the bearing friction of the at least one bearing point can be characterized through an evaluation of the at least one first value and the at least one second value, which is acquired during the second activation of the drive.

In principle, the evaluation can involve comparing the at least one first value and the at least one second value.

Characterizing the bearing friction can involve a qualitative and/or quantitative determination of the bearing friction of the at least one bearing point.

The evaluation can involve calculations including at least the first and the second value.

In general, the evaluation can be individual values or sets of values that are characteristic of the bearing friction, in particular sets ordered in accordance with a temporal or spatial order relation. In particular, these values or sets can be ordered by time, angle or displacement.

The evaluation can involve the values that are acquired in further, similarly designed method steps.

By way of example, the evaluation can be effected by an arithmetic logic unit configured for carrying out the method.

In the first acquisition method step, in one embodiment a first activation of the at least one drive of the arm system can be effected, in which at least the second crane arm is moved relative to the first crane arm. In this case, during the first activation of the drive, the at least one first value can be acquired in the form of at least one measured value that is characteristic of a bearing friction of the at least one bearing point. Such an acquisition can be effected, for example, during the regular operation of the crane arm.

Alternatively or additionally, in one embodiment:
the at least one first value can be acquired in the form of at least one value obtained from a simulation, and/or
the at least one first value can be acquired in the form of at least one empirically obtained value, and/or
the at least one first value can be acquired in the form of a nominal value.

In such an embodiment, in the first acquisition method step the first value can be acquired without a first activation of the at least one drive of the arm system actually taking place if the acquired first value is characteristic of a bearing friction that arises in the case of such an assumed first activation. Such an acquisition can, for example, be effected at the crane arm manufacturer or constructor if the crane arm is purpose-built.

A first value in the form of at least one value obtained from a simulation can be a computed setpoint.

A first value in the form of at least one empirically obtained value can generally be a measured value. Such an empirical value can, for example, originate from a measurement taken at a bearing point or crane arm of identical construction.

A first value in the form of a nominal value can be a predetermined value. For example, it can be taken from a table.

In one embodiment, the evaluation method step can involve a calculation method step in which at least one first and one second metric for the bearing friction is generated from the at least one first and the at least one second value.

A metric for the bearing friction can be a quantitative variable—where applicable with a unit of measurement—that can allow for a direct comparison of the evaluated bearing frictions.

A metric for the bearing friction can allow the bearing friction to be characterized regardless of how the first and/or second value were acquired. In this regard, a metric can be calculated regardless of, for example, the angular range and/or displacement distance of the at least one bearing point over which the first and/or the second value is acquired.

Preferably, at least one first and one second coefficient of friction are calculated as metrics. Using the coefficient of friction (also called the friction coefficient or friction factor), the bearing friction can be characterized as the ratio of the friction force in the bearing point to the contact force in the bearing point.

Contact forces in the bearing point can be calculated, for example, when the weight and position of centre of gravity of the crane arms are known and when the geometry of the arm system is acquired. A measurement of the forces should not be ruled out.

Friction forces in the bearing point can, for example, be calculated from parameters of the drive, such as pressures prevailing in a hydraulic drive or the power consumption of an electrical drive.

In one embodiment of the method, the first value can relate to a first configuration of the crane arms of the arm system. The crane arms of the arm system can be in a second configuration during the second activation of the drive in the second driving method step.

The first and the second configuration of the crane arms can be substantially identical or can be different.

In general, by a configuration of the crane arms may be meant the position of the arms relative to one another. The position of the arms relative to one another can be provided by a certain angular position when the arms are mounted in a hinged manner and/or by a certain displacement position when they are mounted displaceably with respect to one another.

In one embodiment of the method, the movement of the crane arms of the arm system for the first activation of the at least one drive and the movement of the crane arms of the arm system in the driving method step can be substantially identical, or the movements can be different.

Movements of the crane arms can differ on account of the change in the angular position when the arms are mounted in a hinged manner and/or on account of the change in the displacement position when they are mounted displaceably with respect to one another.

During activations of the drive, the same movement can take place, for instance a displacement along a particular displacement distance or a pivoting by a particular angle, but the starting points of the relative movement can be different.

Thus, for example, during different activations, an articulated arm mounted in a hinged manner on a lifting arm and having extenders can be pivoted out of a horizontal position by a particular angle with the same movement but the extenders can be in different displacement positions, which are static during the movement, and so different loads on the bearings can arise. The configuration of the crane arms can thus have an impact on the acquired first and/or second value.

During activations of the drive, for the same configurations can occur, but the relative movements taking place can be different.

Thus, for example, during different activations, an articulated arm mounted in a hinged manner on a lifting arm and having extenders can be moved with the extenders in the same position, but different movements can take place, and so different loads on the bearings can arise. The movement of the crane arms can thus have an impact on the acquired first and/or second value.

In one embodiment, through a suitable choice of the configurations and/or the movements of the crane arm a directly comparable characterization of the bearing friction can be effected for the first and the second value.

A range over which the at least one bearing point moves can, for example, be a certain angular range in the case of a hinged mounting and/or a certain displacement distance in the case of a displaceable mounting.

Advantageously, for the activation of the at least one first and the at least one second drive, there can be at least a partial overlap of the ranges over which the at least one bearing point moves.

In an embodiment in which a first and a second metric for the bearing friction are generated, a comparable characterization of the bearing friction can be effected for different configurations and/or different movements for acquiring the first and the second value.

Advantageously, for the purpose of the method, in the first and second acquisition method steps the following can be acquired as the first and/or second value:
- a breakaway force and/or a breakaway torque of the at least one bearing point and/or
- at least one parameter of the at least one drive, preferably the energy consumption or pump output, and/or
- a friction force of the at least one bearing point and/or
- a hydraulic pressure of a hydraulic cylinder of the drive.

In particular, the at least one drive can be configured as a hydraulic cylinder, and at least one hydraulic pressure of the hydraulic cylinder can be acquired. Advantageously, the drive can be configured as a double-acting hydraulic cylinder, and a rod-side and/or a piston-side hydraulic pressure can be acquired.

If only individual parameters are acquired as the first and/or second value, it can be advantageous if, for these the respective acquisition for the activation of the at least one first and the at least one second drive, there is at least a partial overlap of the ranges over which the at least one bearing point moves.

Advantageously, for the purpose of the method, in the first and second acquisition method steps the following can be acquired as parameters of the bearing friction:
- the supporting force in the at least one bearing point and/or
- the displacement position at least of the first and the second crane arm and/or
- the moment load of the at least one bearing point and/or
- the articulation angle position at least of the first and the second crane arm and/or
- a load attached to the arm system.

Through the acquisition of further parameters, in particular parameters of the geometry of the crane arm, a comparable characterization of the bearing friction can be effected for different configurations and/or different movements for acquiring the first and the second value.

In general, the first and the second value, and any calculated metrics for the bearing friction, can be combined in a set, in particular in a set ordered in accordance with a temporal order relation.

In the comparison method step of the method, to determine an evolution of the bearing friction in the arm system of the crane arm over time, a time curve can be compiled for the evaluation of the at least one first and the at least one second value.

Through the compilation of an evolution of the bearing friction over time, changes in the bearing point, for instance a constant increase in the bearing friction, between the first acquisition method step and the second acquisition method step can be characterized.

When determining the time curve, in the comparison method step a change over time can advantageously be determined for the evaluation of the at least one first and the at least one second value.

When determining a change over time, a gradient of the change over time, i.e. how quickly or how slowly the change occurs, can advantageously be determined for the evaluation of the at least one first and the at least one second value. As a result, trends such as a rapidly increasing deterioration in the bearing friction can be detected.

In an advantageous embodiment of the method, in the comparison method step the evaluation of the at least one first and the at least one second value can be compared with a predetermined or predeterminable threshold value. In particular, when the bearing friction is characterized quantitatively, a comparison with a predetermined or predeterminable threshold value can be effected. A threshold value can be based on individual parameters and/or on a metric for the bearing friction.

Protection is also sought for a computer program product comprising commands which, when executed by an arithmetic logic unit, cause said arithmetic logic unit to perform a method as described above from a storage unit that has or can have a data link to the arithmetic logic unit.

By way of example, the computer program product can be stored in at least one storage unit of a controller and be executed by the at least one arithmetic logic unit of a controller.

Protection is also sought for a controller having an arithmetic logic unit for a crane having a crane arm, configured for carrying out a method as described above for determining a bearing friction in the arm system of the crane arm.

In a driving operating mode, it is possible for the controller to be able to carry out a first and a second activation of the at least one drive of the arm system, in each of which at least the second crane arm is moved relative to the first crane arm. When the at least one drive of the arm system is activated, individual arms can be moved substantially freely by a user by issuing control commands, or a sequence of movements predetermined by the arithmetic logic unit of the controller can be effected.

In an acquisition operating mode, it is possible for an acquisition of at least one first and at least one second value, each of which is characteristic of a bearing friction of the at least one bearing point, to be able to be carried out during the first and the second activation of the drive. The at least one and at least second value can be stored in a storage unit that communicates with the arithmetic logic unit of the controller.

In an evaluation operating mode, it is possible for a characterization of the bearing friction in the arm system of the crane arm to be able to be carried out through an evaluation of the at least one acquired first value and the at least one acquired second value. When characterizing the bearing friction, calculations including the at least one first value and the at least one second value can be effected.

In an advantageous embodiment of the controller, it is possible for an evaluation in relation to the bearing friction, characterized in the evaluation method step, in the arm system of the crane arm to be able to be displayed on a display that communicates with the arithmetic logic unit.

By way of example, a display can involve a qualitative characterization of the bearing friction, such as a positive or negative assessment, a maintenance prompt or a display of a defective bearing point.

By way of example, a display can involve a quantitative characterization of the bearing friction, such as an indication of a coefficient of friction, of a breakaway force and/or of a breakaway torque, of a friction force or of a relative numerical statement on the quality of the bearing point.

Protection is also sought for a crane—preferably a cargo crane for a vehicle, particularly preferably a knuckle boom crane—having a controller as described above having an arithmetic logic unit.

BRIEF DESCRIPTION OF THE DRAWINGS

Embodiment examples of the invention will be discussed on the basis of the figures, in which:

FIGS. 7a and 7b are schematic representations of embodiments of the method, FIGS. 9a to 9d are graphical representations of acquired values and evaluations of acquired values, FIGS. 12a and 12b are schematic representations of an arm system during a movement.

DETAILED DESCRIPTION OF THE INVENTION

Figure 1:
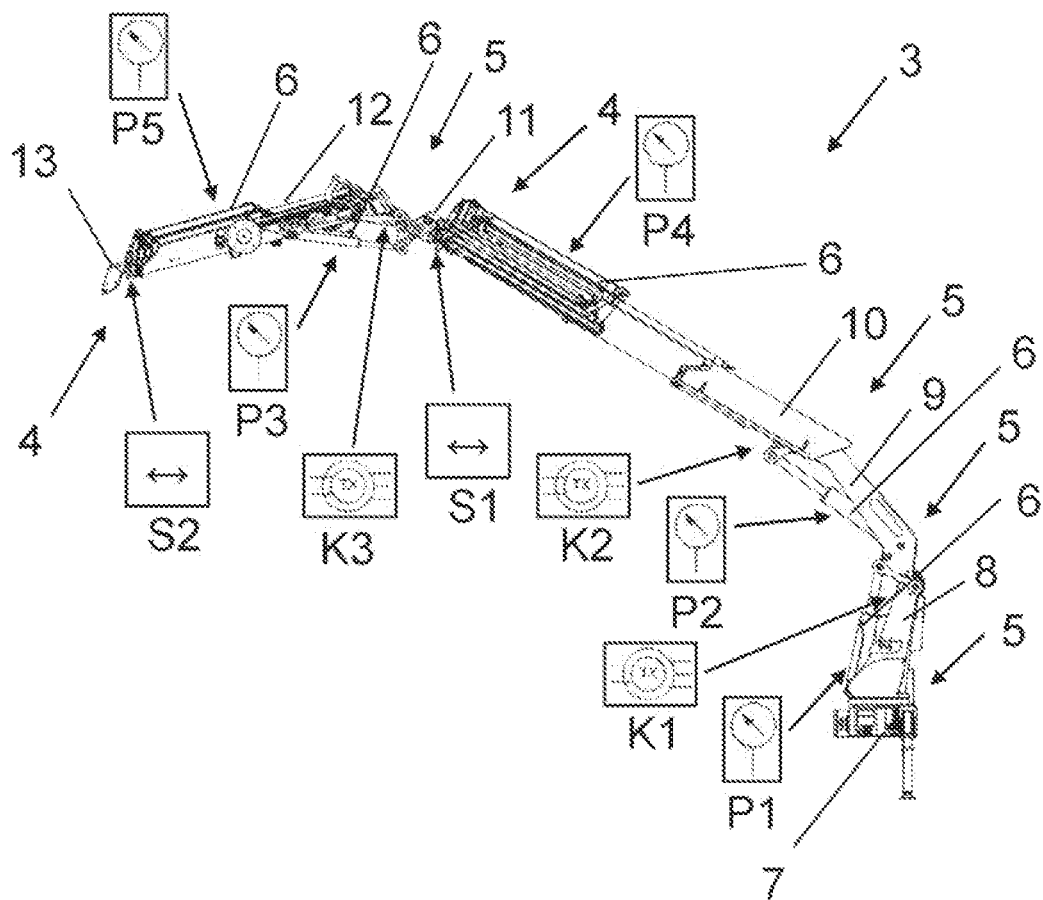
FIG. 1 is a side view of an embodiment of an arm system having sensors for acquiring parameters of the bearing friction.

FIG. 1 shows a side view of an embodiment of an arm system of a crane arm 3 having sensors for acquiring operating parameters, which can be used as parameters of the bearing friction. As crane arms, the crane arm 3 can have at least a crane pillar 8 mounted pivotably on a base 7, a lifting arm 9 mounted in a hinged manner on said crane pillar and an articulated arm 10 mounted in a hinged manner on said lifting arm. The articulated arm 10 can be configured to be length-adjustable having extenders that are displaceable with respect to one another, wherein the forwardmost extender 11 is visible. As represented in FIG. 1, a further crane arm, for instance in the form of a further articulated arm 12, can be arranged in a hinged manner on the articulated arm 10. Unlike what is represented, it should not be ruled out that the lifting arm 9 has extenders that are displaceable with respect to one another.

The arm system can have drives 6 for the movements of the crane arms 7, 8, 9, 10, 11, 12, 13, 14 relative to one another. Such a drive 6 can, for example, be present as a hydraulic cylinder between two crane arms that are movable with respect to one another.

To acquire operating parameters of the arm system, which can be used as parameters of the bearing friction, pressure sensors P1, P2, P3, P4, P5 for acquiring hydraulic pressures of the drives 6, angle sensors K1, K2, K3 for acquiring angular positions, and displacement position sensors S1, S2 for acquiring longitudinal extents can be provided. It should not be ruled out that the pressure sensors P1, P2, P3, P4, P5 are able to acquire a piston-side and a rod-side hydraulic pressure of the hydraulic cylinders. It should not be ruled out that the arm system has further sensors, for example for acquiring a breakaway force, a friction force or further parameters of drives 6.

When determining a bearing friction, in general the at least one first crane arm and the at least one second crane arm can be interconnected in a hinged manner by means of a bearing point 4, To make two crane arms length-adjustable, they can be mounted displaceably by means of a bearing point 4. To arrange two crane arms at a variable angle to one another, they can be mounted in a hinged manner by means of a bearing point 5.

In this respect, for example, the crane pillar 8 as the first crane arm can be connected in a hinged manner to the lifting arm 9 as the second crane arm by means of a bearing point 5. Similarly, the base 7 and the crane pillar 8, the lifting arm 9 and the articulated arm 10, and the articulated arm 10 having the further articulated arm 12, in each case being identified as the first and second crane arms, can be mounted on one another in a hinged manner by means of a bearing point 5.

In this respect, the length-adjustable articulated arm 10 as the first crane arm can be mounted displaceably with respect to the extender 11 by means of a bearing point 4. Similarly, the further articulated arm 12 can be mounted displaceably with respect to the further extender 13 by means of a bearing point 4. Extenders of length-adjustable crane arms, in each case being identified as the first and second crane arms, can generally be mounted displaceably with respect to one another by means of a bearing point 4.

A corresponding schematic representation of an arm system of a crane arm 3 having at least one first crane arm and one second crane arm, modeled according to the embodiment of FIG. 1, is shown in FIGS. 8, 10 and 12.

Figure 2:
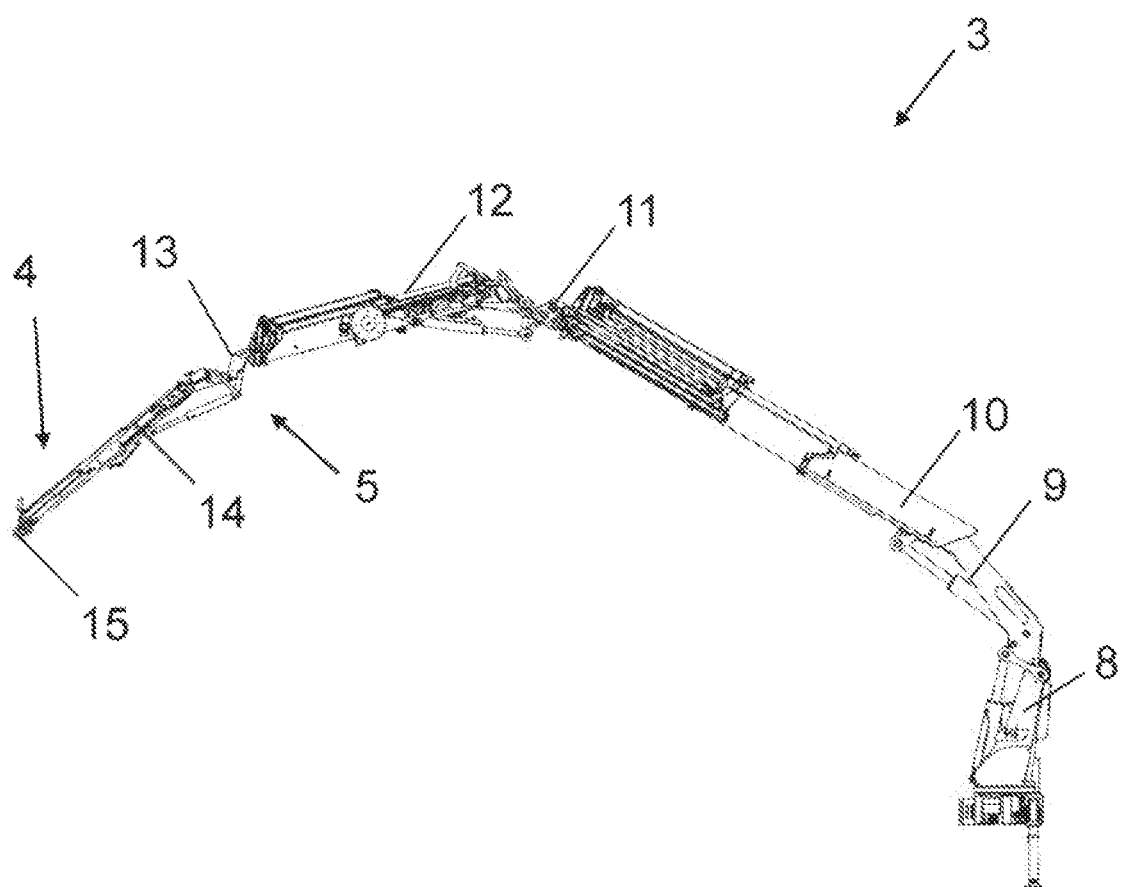
FIG. 2 is a side view of a further embodiment of an arm system.

FIG. 2 shows a further side view of an embodiment of an arm system of a crane arm 3, wherein this embodiment has yet another articulated arm 14 having an extender 15 in addition to the embodiment shown in FIG. 1.

Figure 3:
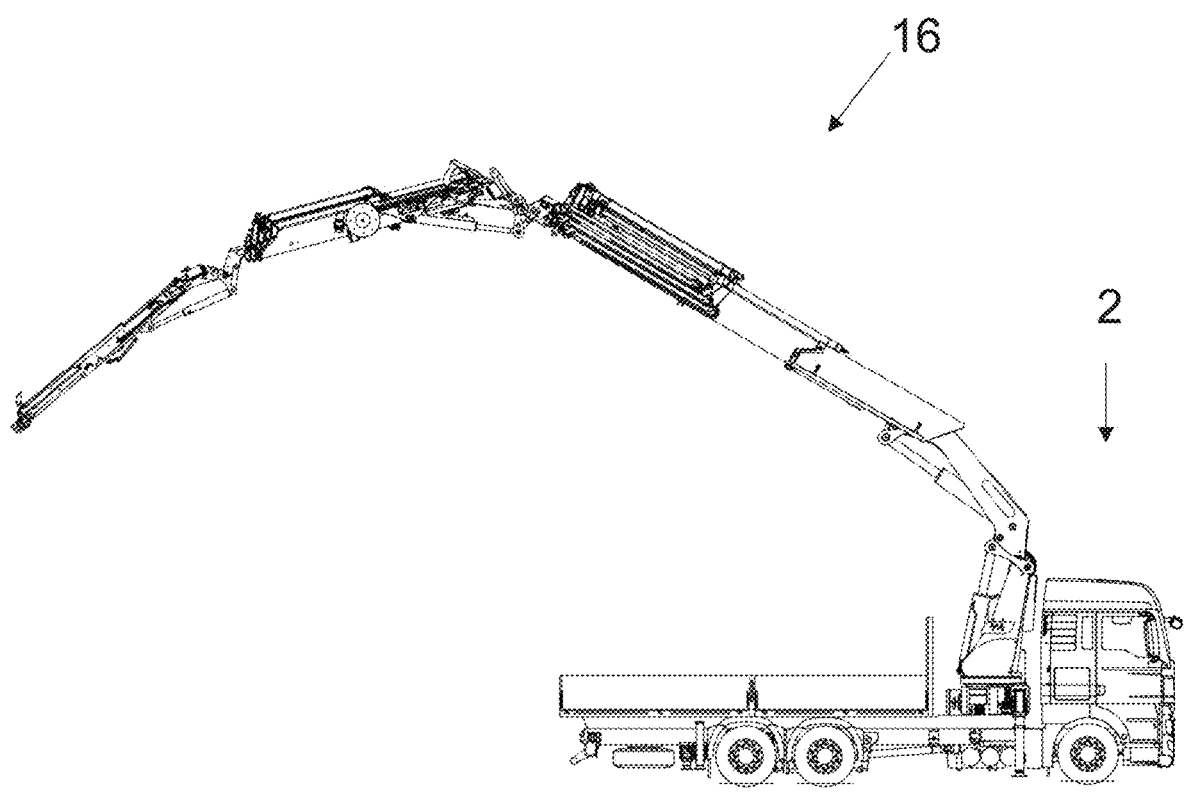
FIG. 3 is a side view of a vehicle having an embodiment of a crane.

FIG. 3 shows a crane 16 fitted on a vehicle 2 (regarding this see, for instance, FIG. 6), wherein the crane arm 3 of the crane 16 is configured as in FIG. 3.

Figure 4:
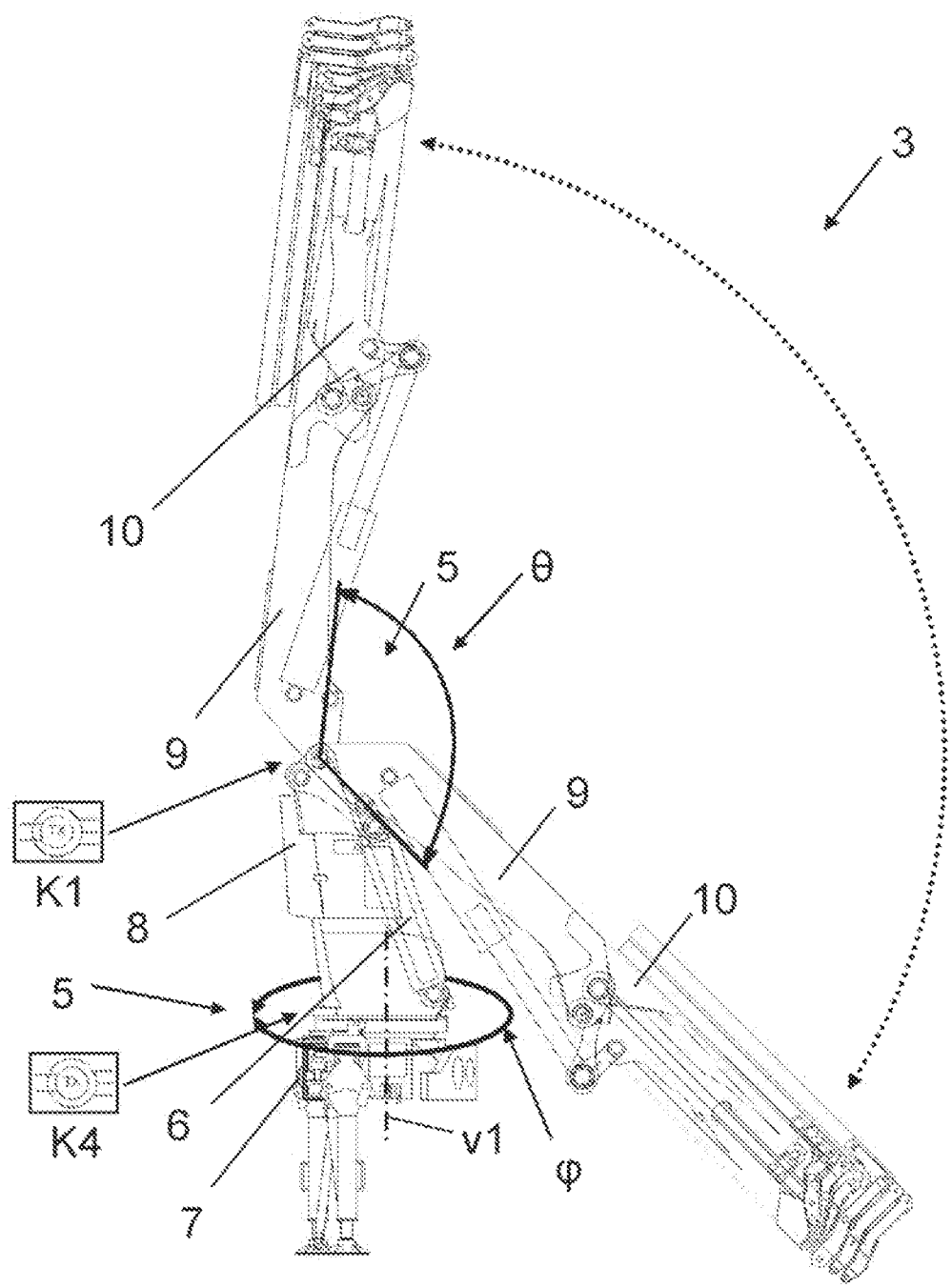
FIG. 4 is a side view of an embodiment of an arm system having an articulated arm mounted in a hinged manner.

FIG. 4 shows an embodiment of a crane arm 3 similar to the embodiment of FIG. 1, having a pivotable crane pillar 8, a lifting arm 9 that can be raised and lowered and an articulated arm 10 mounted in a hinged manner thereon. This figure illustrates the pivot angle range of the pivot angle φ of the crane pillar 8 in relation to the base 7 about a vertical pivot axis v1, and the articulation angle range of the articulation angle θ of the lifting arm 9 in relation to the crane pillar 8. Such a movement of two crane arms of the arm system with respect to one another can—at least in some portions—occur when a corresponding drive 6 (not represented for the crane pillar 8; for the lifting arm 9 for instance in the form of the hydraulic cylinder) of the arm system is activated. The pivot angle φ of the crane pillar 8 in relation to the base 7 can be acquired with an angle sensor K4.

Figure 5:
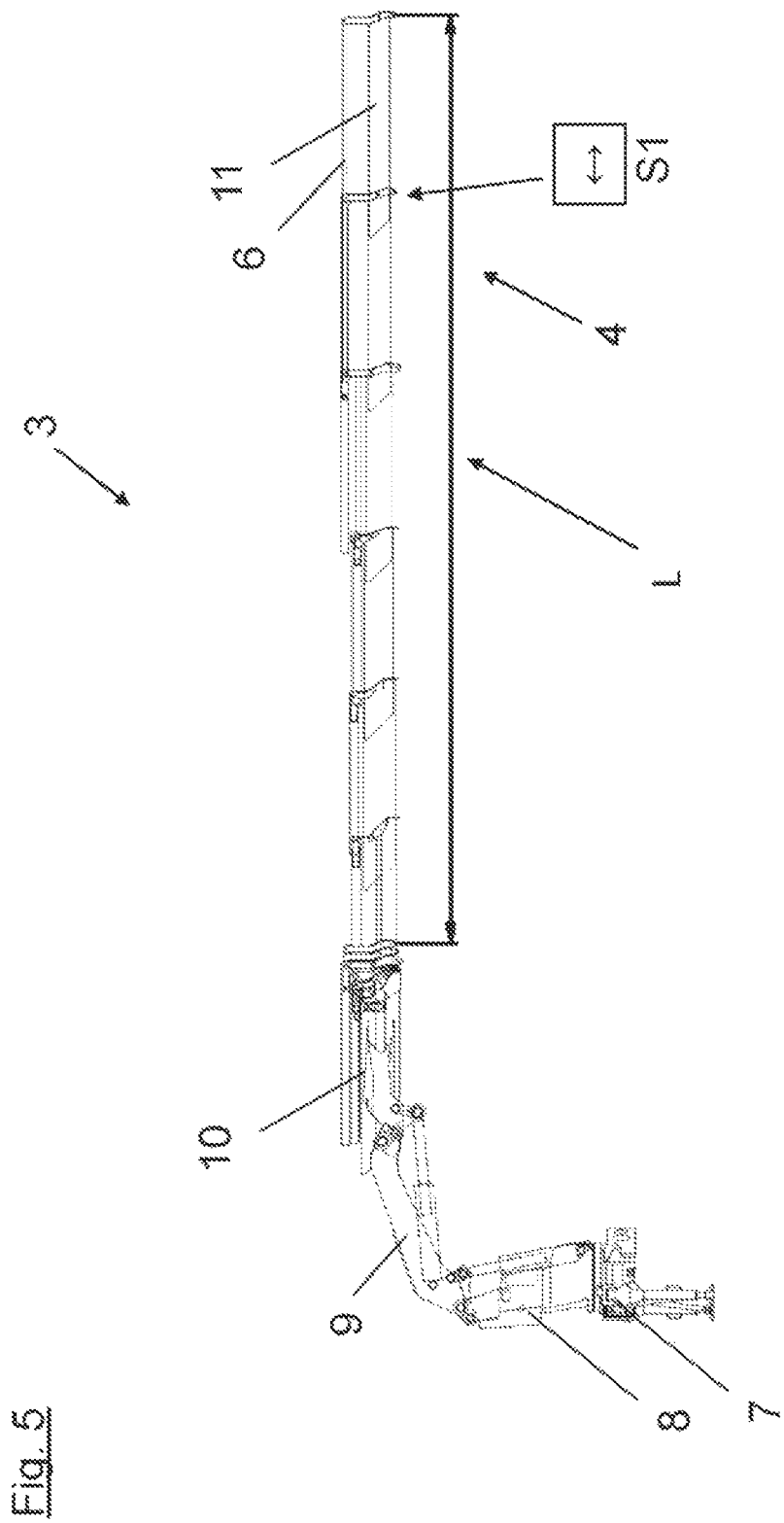
FIG. 5 is a side view of an embodiment of an arm system having a length-adjustable articulated arm having displaceably mounted extenders.

FIG. 5 shows the embodiment of the crane arm 3 of FIG. 4 with the articulated arm 10 in a horizontal position and the extenders, of which the extender 11 forms the forwardmost extender, substantially fully extended. A resulting longitudinal extent L of the articulated arm 10 can be acquired by means of the displacement position sensor S1, for example in the form of a measuring cable.

Figure 6:
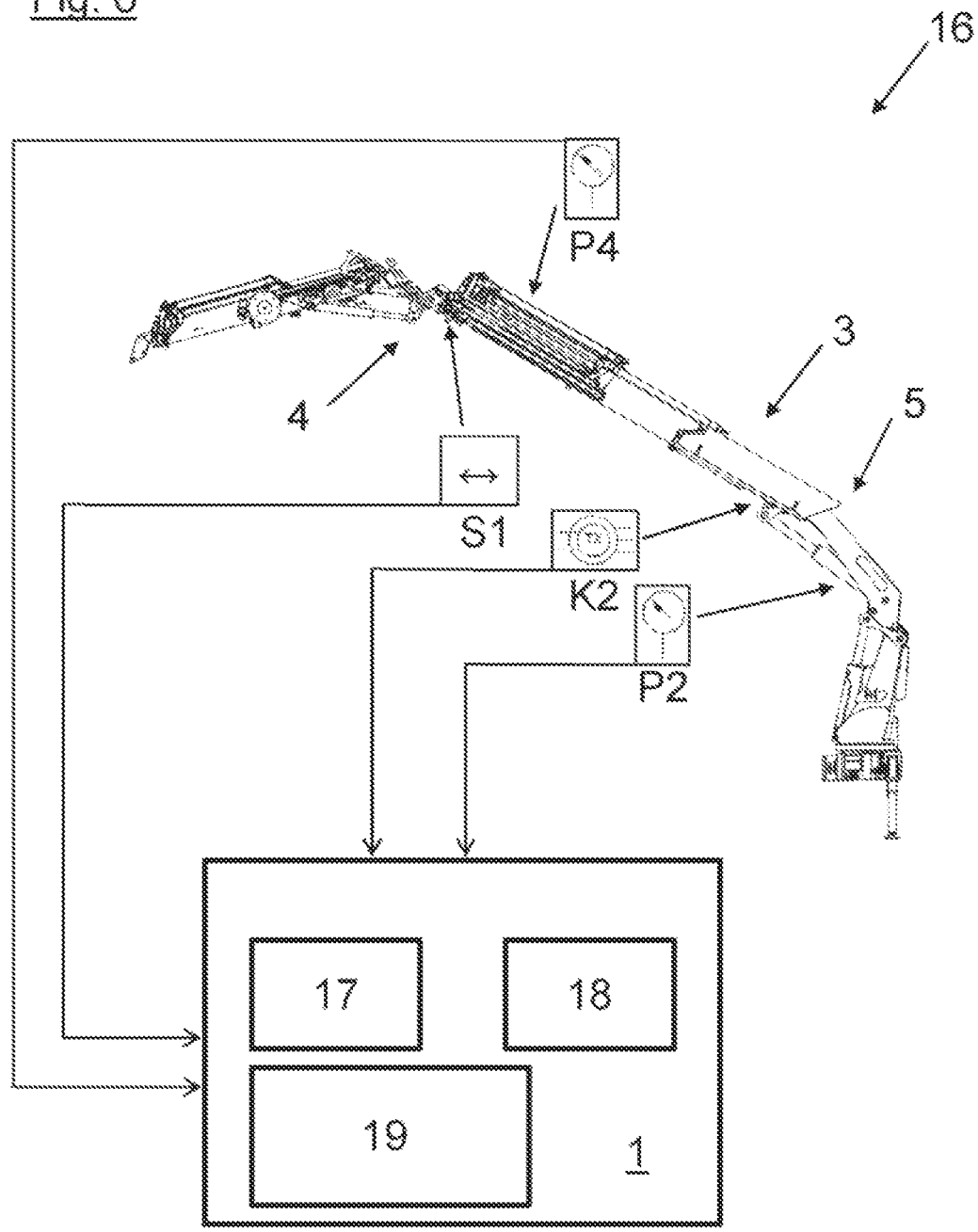
FIG. 6 is a side view of an embodiment of a crane having a crane arm, a controller and selected sensors for acquiring parameters of the bearing friction.

FIG. 6 shows an embodiment of a crane 16 having a crane arm 3, designed similarly to the embodiment of FIG. 1, and a controller 1. The controller 1 has an arithmetic logic unit 17 and a storage unit 18 that has or can have a data link to the arithmetic logic unit 17. The controller 1 can be configured for activating the drives 6 in the form of the hydraulic cylinders and for acquiring operating parameters of the arm system in the form of measured values. In this embodiment, the controller 1 further has a user interface 19 via which the crane 16 can be controllable by a user. It is also possible for values that are characteristic of a bearing friction of the at least one bearing point 4, 5 during an activation of the at least one drive 6 of the arm system for moving at least the second crane arm 11 relative to the first crane arm 10 to be able to be input via the user interface 19. It should not be ruled out that values that originate from other sources in addition or alternatively to the measured values are able to be supplied to the controller 1, in particular the storage unit 18 of the controller 1, by means of at least one further data interface of the controller 1.

FIG. 7a schematically illustrates an embodiment of the method for determining a bearing friction in an arm system of a crane arm 3.

The arm system has at least one first crane arm and one second crane arm, wherein the second crane arm in the form of the extender 11 is mounted displaceably at least in some portions in the first crane arm in the form of the articulated arm 10 by means of at least one bearing point 4 (FIG. 8) and/or the second crane arm in the form of the articulated arm 10 is mounted in a hinged manner on the first crane arm in the form of the lifting arm 9 by means of at least one bearing point 5 (FIGS. 10 and 12). The arm system has at least one drive 6 in the form of a hydraulic cylinder for the at least first and second crane arm; when said drive is activated, a relative movement between the at least one first crane arm and the at least one second crane arm can be effected.

In a first acquisition method step i, at least one first value can be acquired, which is characteristic of a bearing friction of the at least one bearing point 4, 5 during a first activation of the at least one drive 6 in the form of the hydraulic cylinder of the arm system for moving at least the second crane arm relative to the first crane arm.

In the first acquisition method step, the at least one first value can be measured in the form of at least one measured value that is characteristic of a bearing friction of the at least one bearing point 4, 5 during a first activation of the at least one drive 6 in the form of a hydraulic cylinder of the arm system, in which at least the second crane arm is moved relative to the first crane arm, and/or can be acquired in the form of at least one value that is obtained from a simulation and able to be supplied, for example, to the controller 1, in particular the storage unit 18, via a corresponding data interface, and/or can be acquired in the form of at least one empirically obtained value that is able to be supplied, for example, to the controller 1, in particular the storage unit 18, via a corresponding data interface, and/or can be acquired in the form of a nominal value that is able to be supplied, for example, to the controller 1, in particular the storage unit 187, via a corresponding data interface.

The at least one first value can be stored in a storage unit 18 of the controller 1.

In a driving method step ii, a second activation of the at least one drive 6 of the arm system can be effected. During the activation, at least the second crane arm can be moved relative to the first crane arm, as illustrated by way of example in FIGS. 8, and 12.

In a second acquisition method step iii, during the second activation of the at least one drive 6 in the form of the hydraulic cylinder, at least one second value can be acquired, which is a measured value that is characteristic of a bearing friction of the at least one bearing point 4, 5.

The at least one second value can be stored in a storage unit 18 of the controller 1.

In an evaluation method step iv, the bearing friction of the at least one bearing point 4, 5 can be characterized through an evaluation, in which the values can be read out from the storage unit 18, of the at least one first value and the at least one second value, which is acquired during the second activation of the drive 6.

By way of example, the evaluation can be effected by an arithmetic logic unit 17 of the controller 1.

Figure 7B:
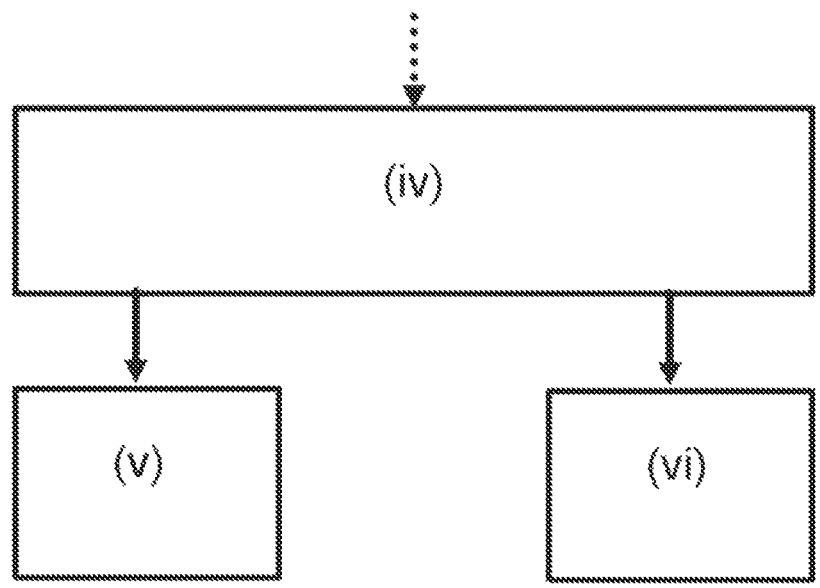

FIG. 7b shows a continuation of the method, in which in a calculation method step v at least one first and one second metric for the bearing friction can be calculated (see for example FIG. 13), and, alternatively or in combination, in a comparison method step vi an evolution of the bearing friction in the arm system of the crane arm over time can be determined (see for example FIG. 9).

FIGS. 8 and 10 each schematically represent movements of a crane arm 3, in each of which the type of movement of the crane arms of the arm system is identical for a first activation of the at least one drive 6 and the movement of the crane arms of the arm system in the driving method step is identical. The respective configurations of the crane arms are comparable too, i.e. there is no superposition of different movements.

Figure 8A:
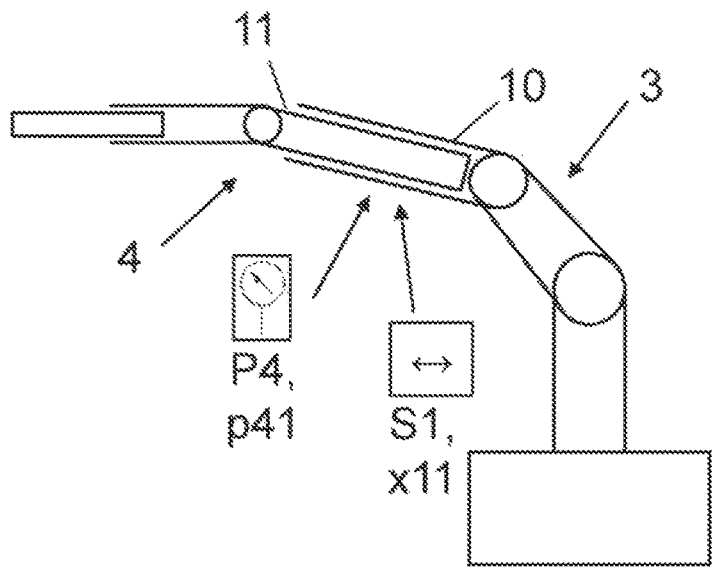
FIGS. 8a to 8c are schematic representations of an arm system during a movement.
Figure 8B:
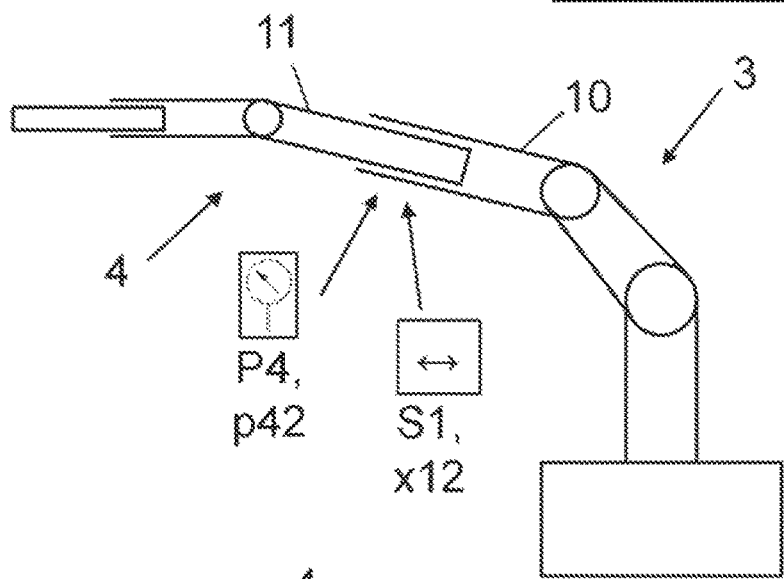
Figure 8C:
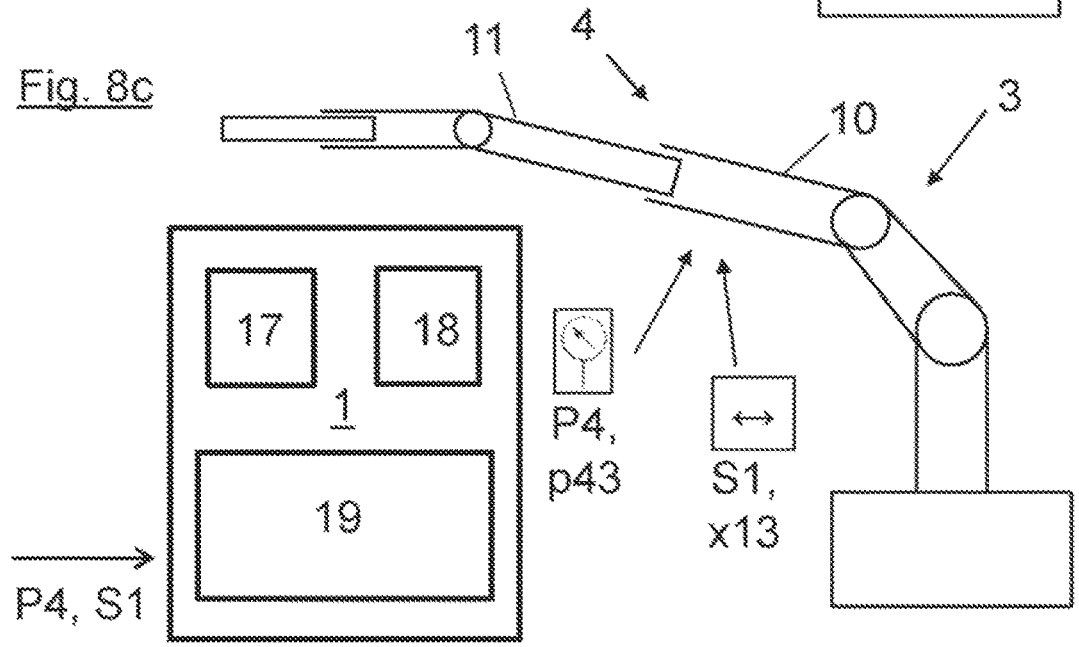

FIGS. 8a to 8c show schematic representations of an arm system during a movement. The embodiment of the schematically represented crane arm 3 can substantially correspond to that of FIGS. 1, 4, and 6.

What is illustrated is a movement of a second crane arm in the form of an extender 11 relative to a first crane arm in the form of an articulated arm 10, driven by a drive 6 (not represented here) in the form of a hydraulic cylinder, for example. Three different longitudinal extents L having displacement positions x11, x12, x13, acquired by a displacement position sensor S1, are shown. The hydraulic pressures p41, p42, p43 that accordingly arise during the movement are acquired by a pressure sensor P4. By way of example, this can be effected in a first and/or second acquisition method step i, ii. The sensor data can be able to be supplied to a controller 1.

The movement represented schematically in FIGS. 8a to 8c can correspond to an activation of the at least one drive 6 in a first acquisition method step i. The represented movement can also correspond to an activation in a driving method step ii.

During the operation of the crane arm 3, the movement can be repeated multiple times. In each case, the sensor data can be recorded.

Figure 9A:
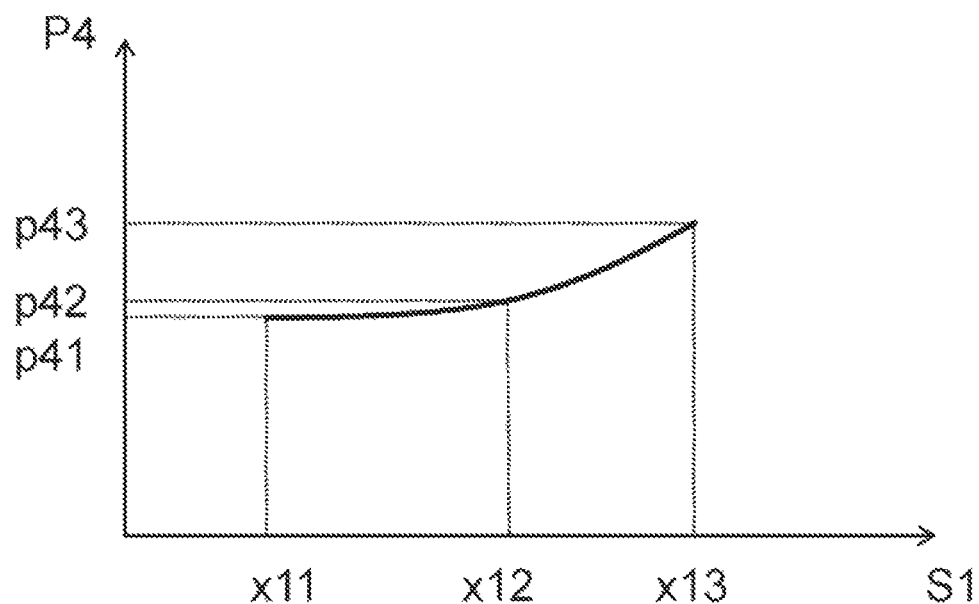

FIG. 9a shows the curve of the hydraulic pressure acquired with the pressure sensor P4 plotted against the displacement position acquired by the displacement position sensor S1.

The hydraulic pressure can be acquired a first acquisition method step i. At least one first value in the form of the hydraulic pressure, which is characteristic of a bearing friction of the at least one bearing point 4 during a first activation of the at least one drive 6 of the arm system for moving at least the second crane arm in the form of the extender 11 relative to the first crane arm in the form of the articulated arm 10, can be measured, for example during a movement as represented in FIG. 8, or can be acquired by predetermining a value.

In principle, at least one first and/or second value can be acquired at least at one point or continuously.

Figure 9B:
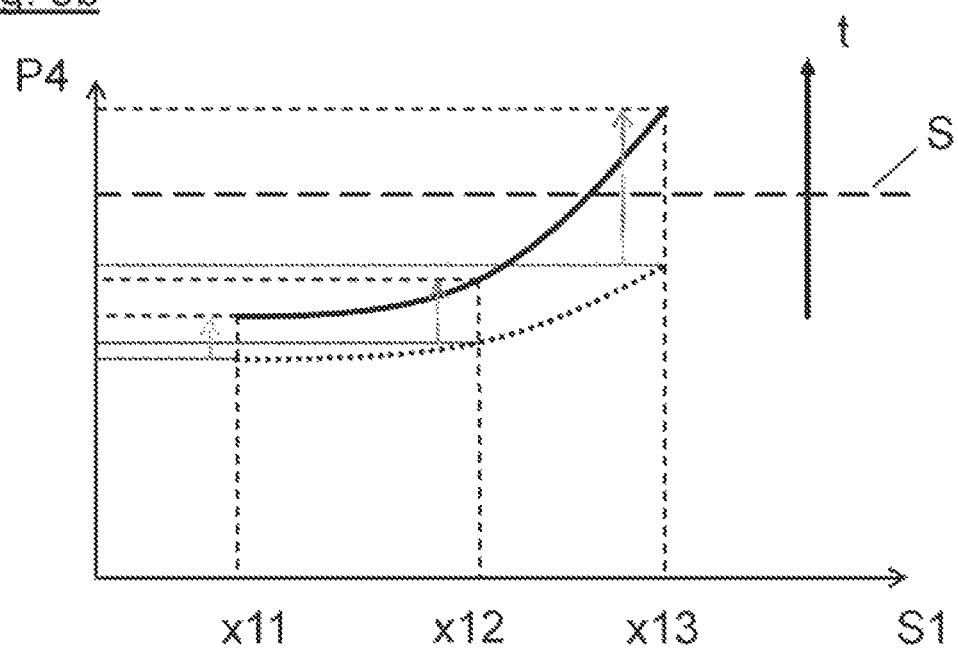

In addition to the curve shown in FIG. 9a (dotted line), FIG. 9b shows the curve of a second value in the form of a hydraulic pressure acquired with the pressure sensor P4. The additionally represented curve of a second value in the form of the hydraulic pressure may have been acquired at a later time t, for example after a certain number of operating hours of the crane arm 3, in a second acquisition method step iii during a second activation according to FIG. 8 of the at least one drive 6.

During an evaluation in an evaluation method step iv, the bearing friction of the at least one bearing point 4 can be characterized.

Using the generally higher hydraulic pressure required for the same movement in this embodiment, it can be qualitatively established that the bearing friction has increased.

In a comparison method step vi, the evaluation of the at least one first and the at least one second value can be compared with a predetermined or predeterminable threshold value S.

In a calculation method step v for the evaluation method step iv, at least one first and one second metric for the bearing friction can be generated from the at least one first and the at least one second value. If, for example, the rod-side and piston-side hydraulic pressure is acquired by the pressure sensor P4, the force required for moving the extender 4 can be calculated as a metric for the bearing friction of the bearing point 4.

FIG. 9c shows a set of curves of hydraulic pressures acquired by the pressure sensor P4. Starting from a first acquisition method step i, the individual curves may have been acquired in a repetition of driving method steps ii and second acquisition method steps iii at different times t, advantageously for instance at regular intervals or accordingly weighted intervals of operating hours of the crane arm 3.

FIG. 9d represents a time curve of the pressure increase 442 of the hydraulic pressure p42 acquired at specific points at the displacement position x12.

For this purpose, in the evaluation method step iv the corresponding hydraulic pressure p42 acquired in the first acquisition method step i can be subtracted from each hydraulic pressure p42 acquired in the second acquisition method step iii at the displacement position x12. In a comparison method step vi, to determine an evolution of the bearing friction in the arm system of the crane arm 3 over time, a time curve can be compiled for such an example evaluation of the at least one first and the at least one second value in the form of the hydraulic pressures p42. As a result, a change over time can also be determined for the evaluation. In particular, a gradient of the change over time, i.e. a rate of the increase, can be determined for the evaluation.

Figure 10A:
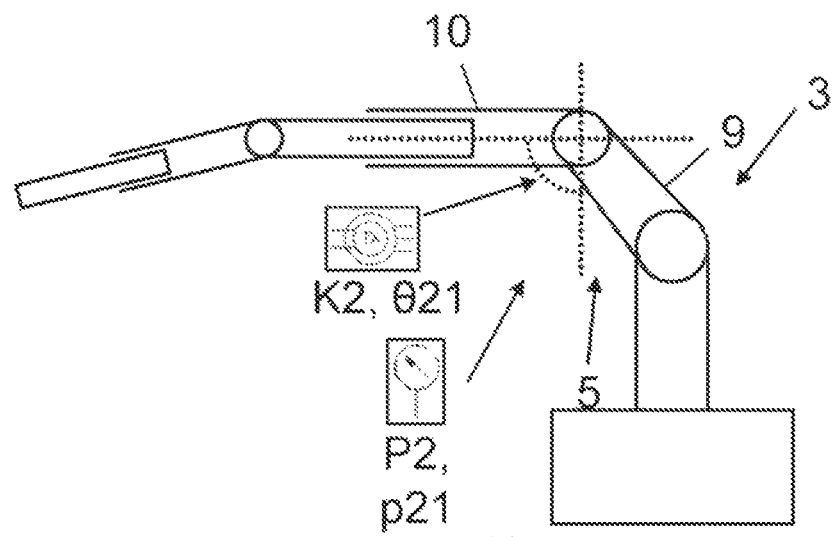
FIGS. 10a to 10c are schematic representations of an arm system during a movement.
Figure 10B:
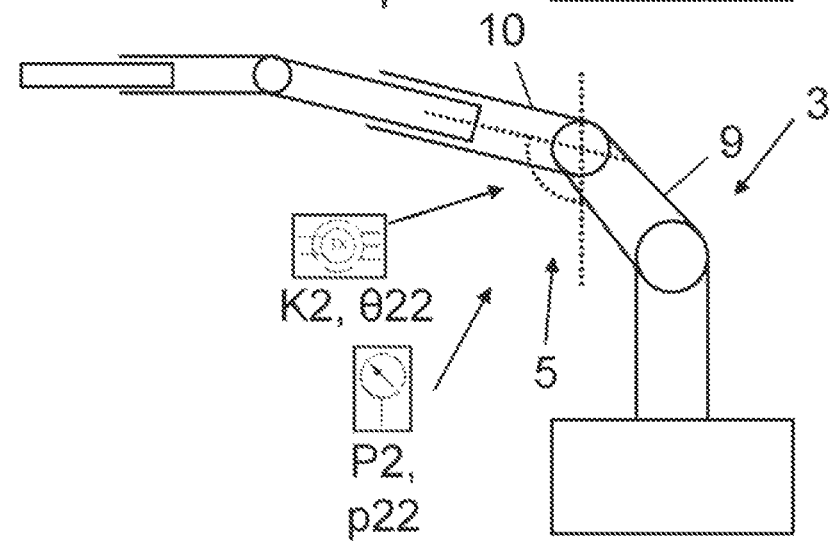
Figure 10C:
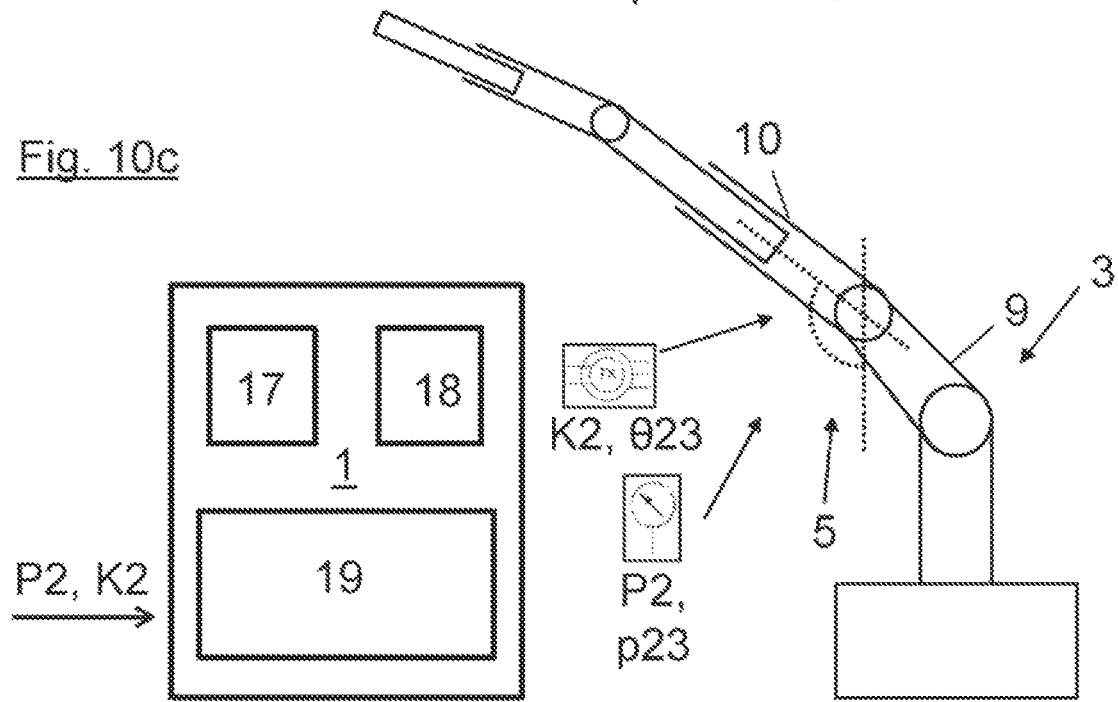

FIGS. 10a to 10c show schematic representations of an arm system during a movement around the bearing point 5. The embodiment of the schematically represented crane arm 3 can substantially correspond to that of FIGS. 1, 4, 5 and 6.

What is illustrated is a movement around the bearing point 5 of a second crane arm in the form of an articulated arm 10 relative to a first crane arm in the form of a lifting arm 9, driven by a drive 6 (not represented here) in the form of a hydraulic cylinder, for example. Three different articulation angle positions $\theta 21$, $\theta 22$, $\theta 23$, acquired by an angle sensor K2, are shown. The hydraulic pressures p21, p22, p23 that accordingly arise during the movement are acquired by a pressure sensor P2.

Figure 11A:
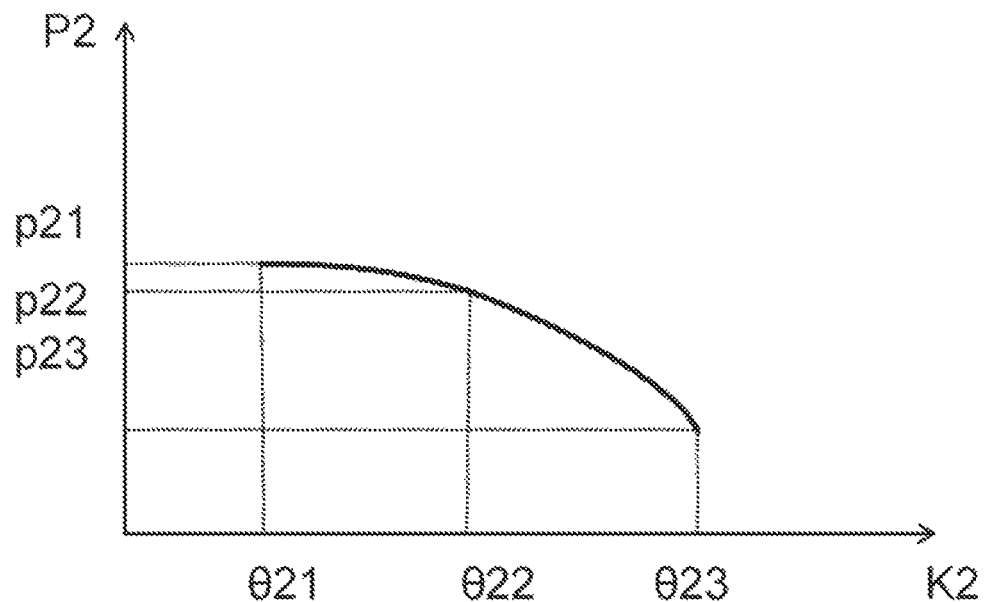
FIGS. 11a and 11b are graphical representations of acquired values and evaluations of acquired values.

FIG. 11a shows the curve of the hydraulic pressure acquired with the pressure sensor P2 plotted against the angular position acquired by the angle sensor K2.

Figure 11B:
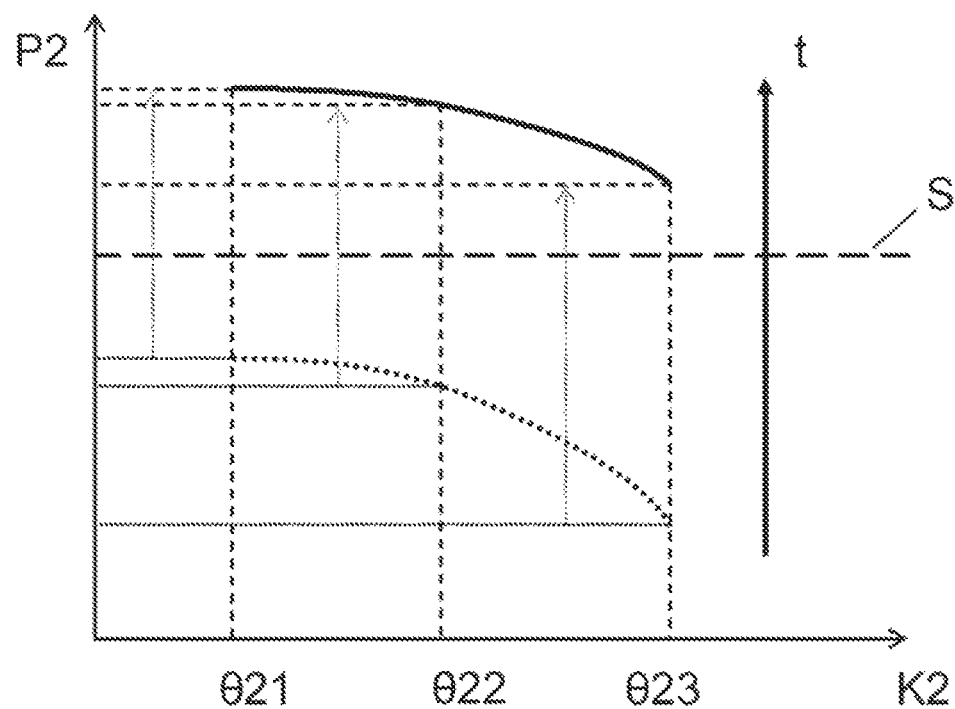

In addition to the curve shown in FIG. 11a (dotted line), FIG. 11b shows the curve of a second value in the form of a hydraulic pressure acquired with the pressure sensor P2.

For the movement illustrated in FIGS. 10a to 10c around the bearing point 5 and the corresponding evaluations in FIGS. 11a and 11b, similar statements and conclusions to those in FIGS. 8a to 8c and 9a to 9d can be made and will not be explicitly repeated at this juncture.

FIGS. 12a and 12b schematically represent a movement of a crane arm 3 in which, in contrast to the examples discussed above, the movement of the crane arms of the arm system for a first activation of the at least one drive and the movement of the crane arms of the arm system in the driving method step are different. The configurations of the crane arms also differ. A multiplicity of different superpositions of different movements can thus be effected at the transition from FIG. 12a to FIG. 12b.

For such a movement, metrics for the bearing friction, in particular in the form of at least one dimensionless coefficient of friction p, can advantageously be calculated from the acquisition of the first and/or second value as a ratio of the friction force in the bearing point 4, 5 to the contact force in the bearing point 4, 5 in order to characterize the bearing friction.

Contact forces in the bearing points 4, 5 can be calculated, for example, when the weight and position of centre of gravity of the crane arms of the crane arm 3 are known and when the geometry of the arm system is acquired. Friction forces in the bearing points 4, 5 can, for example, be calculated from parameters of the drive 6, such as prevailing hydraulic pressures.

Figure 13A:
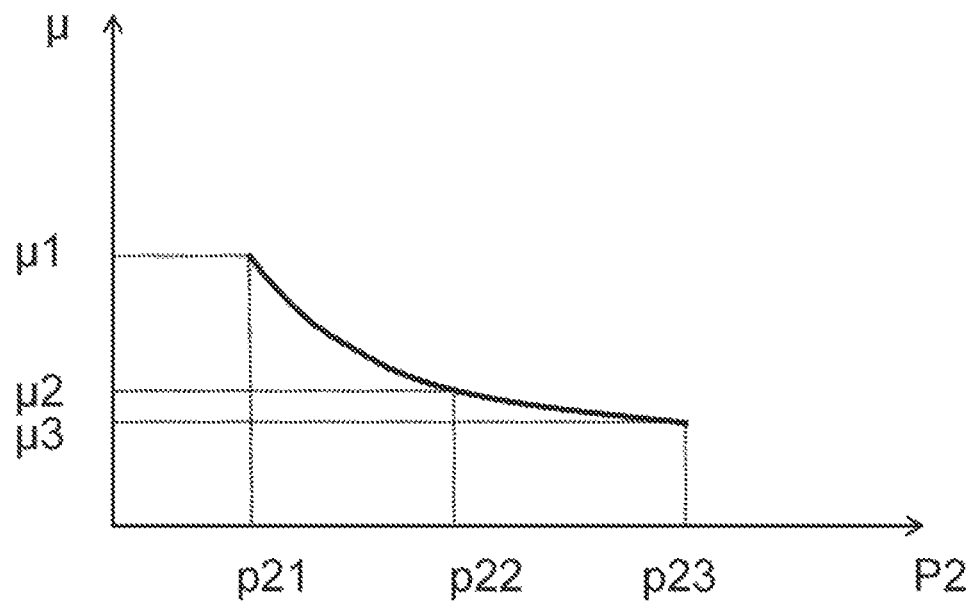
FIGS. 13a and 13b are graphical representations of acquired values and evaluations of acquired values.

FIG. 13a shows the curve of a first value in the form of the coefficient of friction p plotted against the hydraulic pressure, acquired the pressure sensor P2, in the drive 6 in the form of the hydraulic cylinder between the articulated arm 10 and the lifting arm 9. The pressure acquired by P2 is proportional to the moment load acting at the bearing point 5, and thus is significant for the curve of the coefficient of friction p in the bearing point 5. A similar representation and characterization can be effected for the pressure sensor P4, the pressure acquired by which is proportional to the displacement load acting at the bearing point 4. The coefficient of friction p can generally be calculated in a calculation method step v for the evaluation method step iv.

Figure 13B:
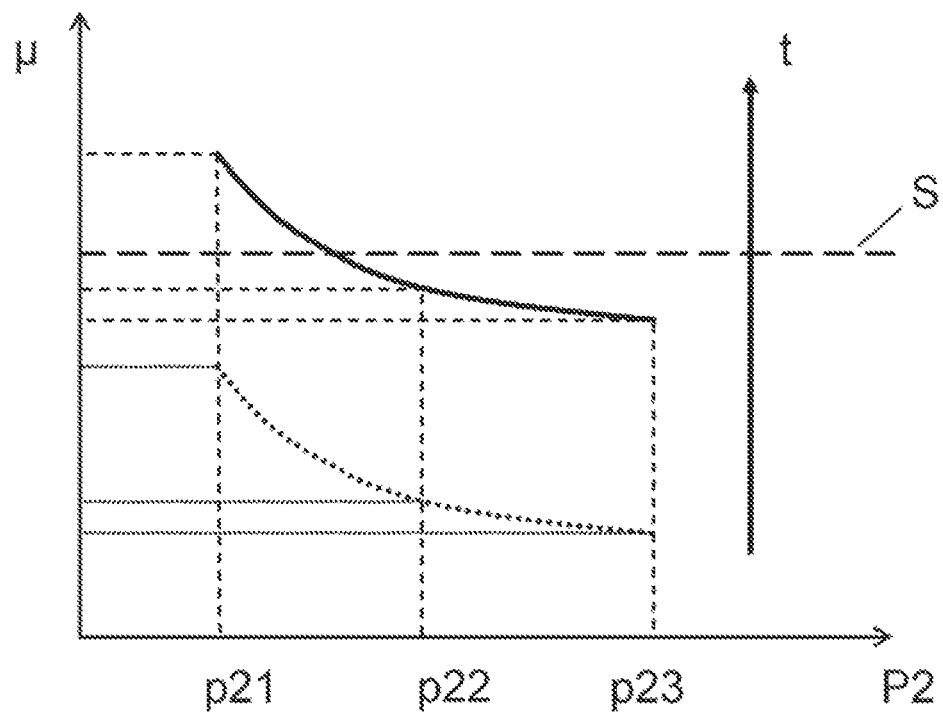

In addition to the curve shown in FIG. 13a (dotted line), FIG. 13b shows the curve of a second value in the form of the coefficient of friction p. The additionally represented curve of a second value in the form of the coefficient of friction p may have been acquired at a later time t, for example after a certain number of operating hours of the crane arm 3, in a second acquisition method step iii during a second activation according to FIG. 12 of the at least one drive 6.

Figure 14A:
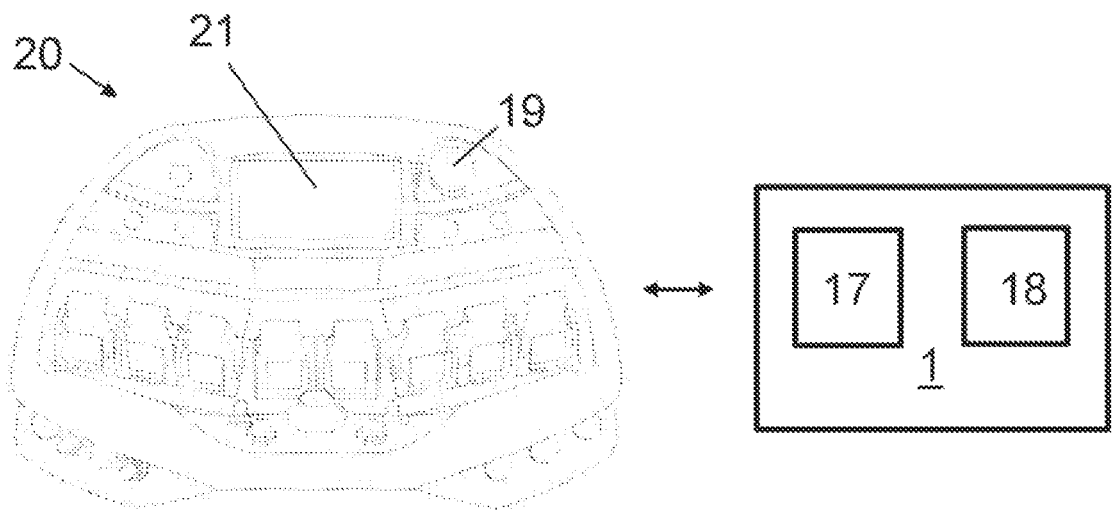
FIGS. 14a and 14b show an embodiment of an arrangement consisting of a radio remote control and a controller, and an embodiment of a depiction on a display.
Figure 14B:
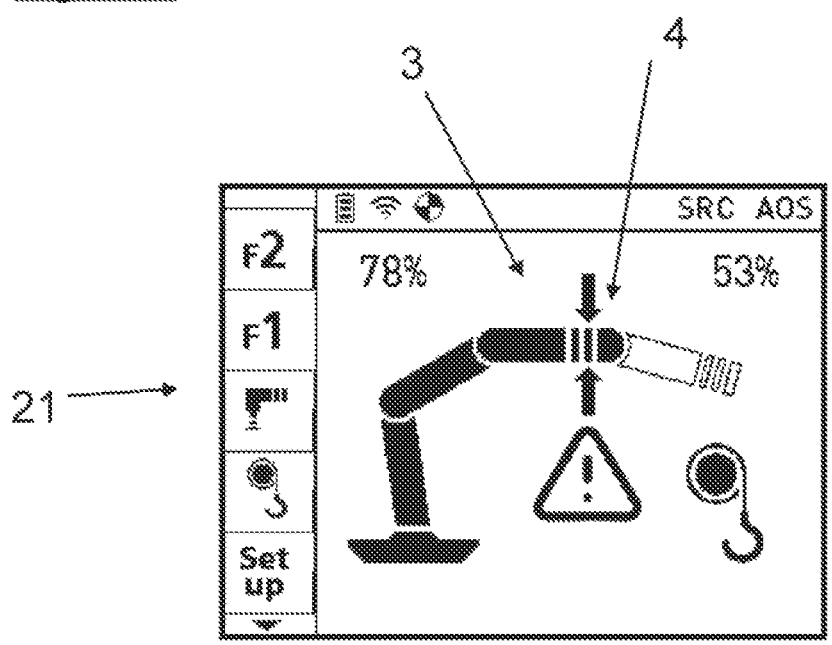

FIGS. 14a and 14b show an embodiment of an arrangement consisting of a radio remote control 20 and an embodiment of a controller 1, and an embodiment of a depiction on a display 21 of the radio remote control 20.

The radio remote control 21 can have a user interface 19 having different buttons and can communicate with the controller 1 in a wireless and/or wired manner.

An evaluation in relation to the characterized bearing friction in the arm system of the crane arm 3 can be able to be displayed on a display 21 of the radio remote control 20.

On the display 21, a qualitative characterization of the bearing friction, such as a positive or negative assessment or a maintenance prompt, can for example be effected or, as represented, can involve a display of a defective bearing point 4.

LIST OF REFERENCE NUMBERS

1 Controller
2 Vehicle
3 Crane arm
4 Bearing point
5 Bearing point
6 Hydraulic cylinder
7 Base
8 Crane pillar
9 Lifting arm
10 Articulated arm
11 Extender
12 Articulated arm
13 Extender
14 Articulated arm
15 Extender
16 Crane
17 Arithmetic logic unit
18 Storage unit
19 User interface
20 Radio remote control
21 Display
P1, P2, P3, P4, P5 Pressure sensors
p21, p22, p23 Hydraulic pressure
p41, p42, p43 Hydraulic pressure
S1, S2 Displacement position sensors
x12, x22, x23 Displacement position
K1, K2, K3, K4 Angle sensors
$\varphi$ Pivot angle
$\theta$ Articulation angle
$\theta 21, \theta 22, \theta 23$ Articulation angle position
v1 Pivot axis
L Longitudinal extent
t Time
S Threshold value
$\Delta$p42 Pressure increase
$\mu$ Coefficient of friction

The invention claimed is:

1. A method for determining a bearing friction in an arm system of a crane arm having at least one first crane arm and one second crane arm, wherein the second crane arm is mounted displaceably at least in some portions in the first crane arm by means of at least one bearing point and/or the second crane arm is mounted in a hinged manner on the first crane arm by means of at least one bearing point, and the arm system has at least one drive for the at least first and second crane arm, wherein:

in a first acquisition method step (i), at least one first value is acquired, which is characteristic of a bearing friction of the at least one bearing point during a first activation of the at least one drive of the arm system for moving at least the second crane arm relative to the first crane arm, in a driving method step (ii), a second activation of the at least one drive of the arm system is effected, in which at least the second crane arm is moved relative to the first crane arm, in a second acquisition method step (iii), during the second activation of the at least one drive at least one second value is acquired, which is a measured value that is characteristic of a bearing friction of the at least one bearing point, and in an evaluation method step (iv), the bearing friction of the at least one bearing point is characterized through an evaluation of the at least one first value and the at least one second value, which is acquired during the second activation of the drive.

2. The method according to claim 1, wherein in the first acquisition method step (i):

a first activation of the at least one drive of the arm system is effected, in which at least the second crane arm is moved relative to the first crane arm, and in the first acquisition method step (i), during the first activation of the drive, the at least one first value is acquired in the form of at least one measured value that is characteristic of a bearing friction of the at least one bearing point, and/or the at least one first value is acquired in the form of at least one value obtained from a simulation, and/or the at least one first value is acquired in the form of at least one empirically obtained value, and/or the at least one first value is acquired in the form of a nominal value.

3. The method according to claim 1, wherein in a calculation method step (v) for the evaluation method step (iv) at least one first and one second metric for the bearing friction, preferably at least one first and one second coefficient of friction ($\mu$), is generated from the at least one first and the at least one second value.

4. The method according to claim 1, wherein the first value relates to a first configuration of the crane arms of the arm system, and the crane arms of the arm system are in a second configuration during the activation of the drive in the driving method step (ii), and the first and the second configuration are substantially identical or are different.

5. The method according to claim 1, wherein the movement of the crane arms of the arm system for a first activation of the at least one drive and the movement of the crane arms of the arm system in the driving method step (ii) are substantially identical, or the movements are different.

6. The method according to claim 1, wherein in the first and/or the second acquisition method step (i, iii):

a breakaway force and/or a breakaway torque of the at least one bearing point are acquired and/or at least one parameter of the at least one drive is acquired and/or a friction force of the at least one bearing point is acquired and/or a hydraulic pressure of a hydraulic cylinder of the drive is acquired.

7. The method according to claim 1, wherein in a comparison method step (vi), to determine an evolution of the bearing friction in the arm system of the crane arm over time, a time curve is compiled for the evaluation of the at least one first and the at least one second value.

8. The method according to claim 7, wherein in a comparison method step (vi) a change over time is determined for the evaluation of the at least one first and the at least one second value.

9. The method according to claim 8, wherein a gradient of the change over time is determined for the evaluation of the at least one first and the at least one second value.

10. The method according to claim 7, wherein in the comparison method step (vi) the evaluation of the at least one first and the at least one second value is compared with a predetermined or predeterminable threshold value.

11. A computer program product comprising commands which, when executed by an arithmetic logic unit, cause said arithmetic logic unit to perform a method according to claim 1 from a storage unit that has or can have a data link to the arithmetic logic unit.

12. A controller having an arithmetic logic unit for a crane having a crane arm, configured for carrying out a method according to claim 1 for determining a bearing friction in the arm system of the crane arm, wherein the controller:

in a driving operating mode, can carry out a first and a second activation of the at least one drive of the arm system, in each of which at least the second crane arm is moved relative to the first crane arm, in an acquisition operating mode, can carry out an acquisition of at least one first and at least one second value, each of which is characteristic of a bearing friction of the at least one bearing point, during the first and the second activation of the drive, and in an evaluation operating mode, can carry out a characterization of the bearing friction in the arm system of the crane arm (3) through an evaluation of the at least one acquired first value and the at least one acquired second value.

13. The controller having an arithmetic logic unit according to claim 12, wherein an evaluation in relation to the bearing friction, characterized in the evaluation method step (iv), in the arm system of the crane arm is able to be displayed on a display that communicates with the arithmetic logic unit.

14. A crane—preferably a cargo crane for a vehicle, particularly preferably a knuckle boom crane—having the controller having the arithmetic logic unit according to claim 12.

* * * * *